(12) United States Patent
Allen et al.

(10) Patent No.: US 6,887,828 B2
(45) Date of Patent: May 3, 2005

(54) PHILLIPSITIC ZEOLITE SOIL AMENDMENTS

(75) Inventors: A. John Allen, 9719 Seven Locks Rd., Bethesda, MD (US) 20817; Sebastian Braum, Kansas City, MO (US)

(73) Assignee: A. John Allen, Greensboro, NC (US)

( * ) Notice: Subject to any disclaimer, the term of this patent is extended or adjusted under 35 U.S.C. 154(b) by 17 days.

(21) Appl. No.: 10/024,225

(22) Filed: Dec. 21, 2001

(65) Prior Publication Data
US 2003/0153466 A1 Aug. 14, 2003

(51) Int. Cl.$^7$ .................. A01N 25/10; A01N 59/00; C05G 3/04
(52) U.S. Cl. .................. 504/120; 504/121; 504/187; 71/62; 71/64.11; 47/1.01; 47/58.1 R; 47/58.1 S
(58) Field of Search .................. 504/120, 121, 504/187; 71/62, 64.11; 47/1.01, 58.1 R, 58.1 S, 58.1 SC

(56) References Cited

U.S. PATENT DOCUMENTS

| | | | |
|---|---|---|---|
| 4,425,143 A | 1/1984 | Nishizawa et al. | |
| 4,772,307 A | 9/1988 | Kiss et al. | 71/13 |
| 5,106,405 A | 4/1992 | Goto et al. | 71/7 |
| 5,451,242 A | 9/1995 | Ming et al. | 71/36 |
| 5,617,672 A | 4/1997 | Garrett | 47/58 |
| 5,900,387 A | 5/1999 | Rines et al. | 504/116 |
| 6,271,174 B1 | 8/2001 | Rines et al. | 504/116.1 |

OTHER PUBLICATIONS

Virta, Robert L. "Zeolites". U.S. Geological Survey Minerals Yearbook—1999. p. 84.1–84.3.*

"Use of Natural Zeolitic Tuffs for Environmental Preservation and Protection," I.M. Dwairi, Dept. Of Earth and Environmental Sciences, Yarmouk University, Jordan, no date.

Green Technology Group Jordan, Product Specification Sheets: Tuffagreen®; Zeolux®; Zeomin+®; Zeomin® and Zeotuff+®. (fax date: Dec. 8, 2001).

Report of Results—"Examination of Rock Samples Zeolites," James Millette, Ph.D., MVA, Inc., Oct. 13, 2000.

"Natural Zeolites: Some Potential Agricultural Applications for Developing Countries," Walter Parham, 1989 Butterworth & Co (Publishers) Ltd.

"Conserving Toxic Ammoniacal Nitrogen in Manure Using Natural Zeolite Tuff: A Comparative Study," I.M. Dwairi, *Bull. Environ. Contam. Toxicol.* (1998) 60:126–133.

"Jordanian Zeolites: Evaluation for Possible Industrial Application of Natural Aritain Phillipsite Tuffs" I.M. Dwairi, *Dirasat*, vol. 19 B, No. 1, 1992.

(Continued)

*Primary Examiner*—S. Mark Clardy
(74) *Attorney, Agent, or Firm*—Oblon, Spivak, McClelland, Maier & Neustadt, P.C.

(57) ABSTRACT

An agricultural and horticultural plant growth zeolite-based composition containing a particular zeolitic (i.e., zeolite-containing) material, termed "Yenomite," is disclosed. This composition exhibits a collection of outstanding advantageous properties in agricultural and horticultural applications. Yenomite, which is found in a particular area of Jordan, comprises primarily phillipsite as the zeolite, optionally in conjunction with palagonite. Yenomite provides surprisingly better results as compared to when other zeolite-based soil amendment compositions, even when it is used as the mined material that has been only subject to a grinding or crushing operation to a desired mesh size. As mined, Yenomite contains very low levels of undesired $Na^+$ ions. It can, therefore, be used without being subjected to a washing operation to remove these ions. Yenomite also possesses a very high CEC. These characteristics, and others, make Yenomite uniquely suitable to use in any agricultural or horticultural operation.

43 Claims, 10 Drawing Sheets

OTHER PUBLICATIONS

"Description of the Processes for the Production of Different Types of Zeomix," Translation of Jordanian Patent No. 1852.

"Evaluation of Jordanian Zeolite Tuff as a Controlled Slow–Release Fertilizer for $NH_4^+$," I.M. Dwairi, *Environmental Geology* 34 (1) Apr. 1998.

"Renewable, Controlled and Environmentally Safe Phosphorus Release in Soils from Mixtures of $NH_4^+$–Phillipsitic Tuff and Phosphate Rocks," I.M. Dwairi, *Environmental Geology* 34 (4) Jun. 1998.

"Division S–8–Fertilizer Management and Technology: Exchange Fertilizer (Phosphate Rock Plus Ammonium–Zeolite) Effects on Sorghum–Sudangrass," K.A. Barbarick, et al., *Soil Sci. Soc. Am. J.* 54:911–916 (1990).

"Zeolux," Green Technology Group Ltd. Publication, no date.

"Use of Volcanic Tuff as Mulch to Reduce Moisture Stress and Increase Productivity of Soils in Arid Areas," I.M. Dwairi, no date.

"Influence of Jordanian Low Grade Zeolite Tuff on Nutrient Concentration and Yield in Strawberry," Ayoup Mohammed Ghrur, et al., (Department of Geology, University of Jordan, Amman, Jordan), no date.

Thesis: "A Chemical Study of the Palagonitic Tuffs of the Aritain Area of Jordan, with Special Reference to Nature, Origin and Industrial Potential of the Associated Zeolite Deposits," I.M. Dwairi, Dec. 1987.

* cited by examiner

PHILLIPSITIC ZEOLITE SOIL AMENDMENTS

BACKGROUND OF THE INVENTION

1. Field of Invention

The present invention relates to zeolitic compositions useful in agriculture and horticulture applications.

2. Discussion of the Background

Zeolites are natural minerals that are mined in many parts of the world or synthesized by man. They are characterized by a microporous, crystalline structure consisting of a three-dimensional framework of $SiO_4$ tetrahedra where all four-corner oxygen ions of each tetrahedra are shared with adjacent tetrahedra. Some of the quadrivalent silicon is replaced by trivalent aluminum, giving rise to a deficiency in positive charge. This charge deficiency is balanced by the presence of mono and divalent cations located in the pores.

These cations are highly mobile and can be exchanged for other cationic species. The Si/Al ratio of natural zeolite is in the range of 1–6. Loosely bound water is also present in the pores of natural zeolites and range from 10–20 wt. % of the dehydrated phase. Zeolites have void spaces (cavities or channels) that can host cations, water or other molecules. Cavities in zeolites enable them to screen molecules and sieve cations.

Cation exchange capacity is primarily a function of the degree of Al substitution for Si in the structure: the greater the substitution, the higher is the deficiency of the positive charge and the greater is the number of alkali cations needed to achieve electrical neutrality. However, cation exchange capacity also depends on other factors, such exposure of the zeolite to cations that are easily trapped in the structure but can not be removed easily. The size of the cations also has an effect on cation exchange capacity. The large cavities and entry channel of zeolites are generally filled with water molecules that form hydration spheres around the exchangeable cations.

The physical and chemical properties of natural zeolites of being to capture and immobilize ammonium ions, water, and certain cations has resulted in numerous investigations into developing agricultural and/or horticultural applications for these materials. Thus the following uses of zeolites have been investigated: holding and slow releasing valuable nutrients to plants, mainly ammonium; uses in conjunction with nitrogen ($NH_4^+$), potassium ($K^+$), magnesium ($Mg^{2+}$), calcium ($Ca^{2+}$) and trace elements; promoting better plant growth by improving the value of fertilizer; prevention of plant burning from over-use of fertilizers by trapping and slowly releasing valuable nutrients; improving the cation exchange capacity of soil resulting in less fertilizer requirements; and improving the water retention of soil.

Attempts to use zeolites in soil amendments have, however, met with mixed results. For example, it has been reported in U.S. Pat. No. 5,900,387, that Japanese farmers have attained significant crop production improvements when zeolites were added to coarse fertilized soils. It has been is reported that experiments at the Department of Agronomy at Colorado State University have shown that relatively high application rates of zeolites restrict leaching losses of $NH_4^+$ from fertilizer in the soil, thereby reducing loss of nitrogen from soils as well as neutralizing low pH soils. See ("Agronomic and Horticultural Uses of Zeolites: A Review", K. A. Barbarick and H. J. Pirila, Zeo Agriculture and Aquaculture, edited by Wilson G. Pond and Frederick A. Mumpton, West View Press, Boulder, Colo., 1984 (International Committee on Natural Zeolites), pp. 93–103; and pp. 113–122, "Use Of Clinoptilolite In Combination With Nitrogen Fertilization To Increase Plant Growth", H. J. Pirela et al; and pp. 263–271, "Application Of Clinoptilolite To Soil Amended With Municipal Sewerage Sludge", M. A. Wilson et al; and references cited in these papers.

However, U.S. Pat. No. 5,900,387 also reports that a body of other experiments have yielded quite mixed results, including experiments on clinoptilolite which has been reported as having a high affinity and selectivity for $NH_4^+$, experiments on zeolites having plant fertilizing nutrients such as $K^+$ or with $NH_4^+$-containing fertilizer components as soil additives. Some successes have been reported with the use of zeolite/phosphate rock as an exchange medium in the fertilizer system in slowing the release of P in soil growing sorghum-sudangrass has been reported ("Exchange Fertilizer Phosphate Rock plus Ammonium Zeolite Effects on Sorghum-Sudangrass", K. A. Barbarick et al, Soil Sci. Soc. AM. J., 54: pp. 911–916 (1990); also the report of Barbarick et al published by the Department of Agronomy and Agricultural Experiment Station, Colorado State University, "Response of Sorghum-Sudangrass in Soils Amended With Phosphate Rock and $NH_4$-Exchanged Zeolite (clinoptilolite) "; and "Influence of $NH_4$-Exchanged Clinoptilolite On Nutrient Concentrations In Sorghum-Sudangrass", D. D. Eberl, K. A. Barbarick and T. M. Lai, Natural Zeolites '93 edited by Douglas W. Ming and Frederick A. Mumpton, International Committee on Natural Zeolites, pp. 491–504, 1995). In the last-named article, increases in nutrient uptake in the plant matter were reported with the addition of $NH_4$-clinoptilolite.

NASA, who has been looking to reducing the amount and cost of carrying plant growing media and, in particular water, in space, has reported that particular zeolite crystals are useful because they permit lowering water and fertilizer component requirements. While such zeolite formulation applications are also useful for water or other purifications and for other environmental clean-up and related purposes, in the case of plant growth applications, only those zeolite formulations that do not result in the production of sodium appear to be suitable.

In the JSC Research and Technology 1993 Annual Report (NASA TM104788), a synthetic soil or substrate for plants (for testing on shuttle flights, called "zeoponic plant growth substrates,") is reported. This material is described as hydrated zeolite crystals containing loosely bonded ions such as $K^+$, $Ca^{++}$, $Mg^{++}$, etc. and combined with calcium phosphate material matrix (apatite). The material is reported to slowly release growth nutrient elements (P, S, Zn, Cu, etc. and the above listed K, Ca and Mg, etc.) into the soil or soil solution for plant absorption or up-take.

However, the ever increasing world-wide demand for food and more efficient uses of natural resources, including water and fertilizers, creates a strong demand for further improvements in agricultural and horticultural materials and techniques. There is, accordingly, a strong demand for new zeolitic composition having improved properties in these applications. In particular, there remains a strong need for an inexpensive and plentiful zeolitic composition that requires little or no processing before use or that possesses a high cation exchange capacity (CEC).

SUMMARY OF THE INVENTION

Accordingly, one object of the present invention is to improve agricultural and horticultural plants growth and development with a zeolite-based composition.

It is another object of the invention to improve the efficiency of fertilizer use in growing agricultural and horticultural plants using a zeolite-based composition.

It is another object of the invention to improve the efficiency of water utilization in growing agricultural and horticultural plant using a zeolite-based composition.

It is another object of the invention to reduce the release of fertilizers used in growing agricultural and horticultural plants into the environment.

It is another object of the invention to provide improved zeolite-based soil amendments.

It is another object of the invention to provide such a zeolite-based composition that is both inexpensive and plentiful.

It is another object of the invention to provide such a zeolite-based composition that requires little or no processing other than crushing or grinding before use in agricultural or horticultural applications.

It is another object of the invention to provide such a zeolite-based composition that possesses a high CEC.

These and other objects of the present invention have been realized with the present discovery that a particular zeolitic (i.e., zeolite-containing) material, termed "Yenomite" herein, exhibits a collection of outstanding advantageous properties in agricultural and horticultural applications. Yenomite, which is found in a particular area of Jordan, comprises primarily phillipsite as the zeolite, optionally in conjunction with palagonite. Yenomite provides surprisingly better results as compared to when other zeolite-based soil amendment compositions, even when it is used as the mined material that has been only subject to a grinding or crushing operation to a desired mesh size.

As mined, Yenomite contains very low levels of undesired $Na^+$ ions. It can, therefore, be used in agricultural and horticultural operations without being subjected to a washing operation to remove these ions. Yenomite also possesses a very high CEC of, for example, 0.90 to 2.5 meq/g or greater. These characterisitics, and others, make Yenomite uniquely suitable to use in any agricultural or horticultural operation.

DETAILED DESCRIPTION OF THE INVENTION

Figure 1:
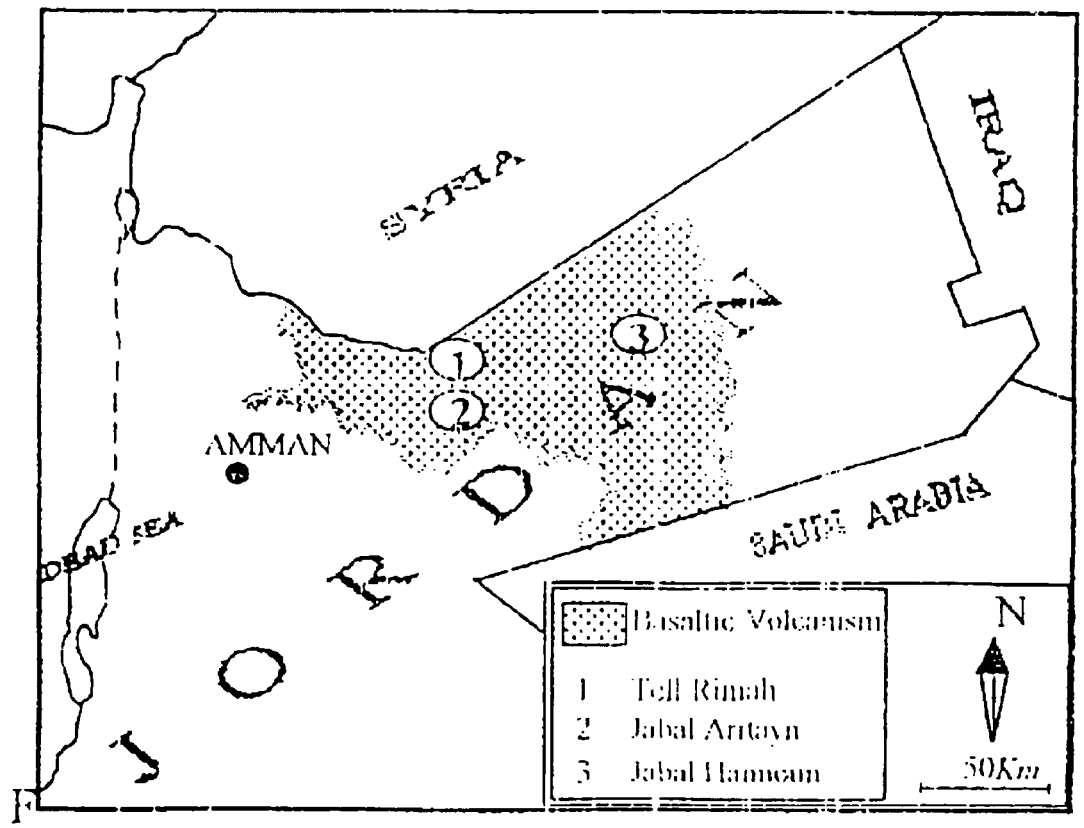
FIG. 1 is a map showing where Yenomite may be obtained.

Yenomite contains at least about 10 weight percent (wt. %) of a particular zeolitic material and may contain up to about 100 wt. % of the zeolitic material. From a practical point of view the zeolitic material content in Yenomite is typically between about 10 and about 80 wt. %, preferably between about 20 and about 70 wt. %, more preferably between about 30 and about 50 wt. %. The balance of the material is comprised of other materials incidentally mixed with the mined Yenomite.

The zeolitic component of Yenomite is primarily phillipsite, but a minor amount of chabazite may also be present. In this embodiment, the phillipsite may be present in amounts ranging from about 10 to about 90 wt. % and the chabazite in amounts ranging from about 1 to about 20 wt. %.

In another preferred embodiment Yenomite contains, as a major zeolitic component, phillipsite, as a minor zeolite component, chabazite, and up to about 20 wt. % of palagonite. In this embodiment, the phillipsite may be present in amounts of about 30 to about 70 wt. %, the chabazite in amounts of about 1 to about 20 wt. %, and palagonite in amounts of about 2 to about 30 wt. %.

When Yenomite contains palagonite it exhibits a very strong effect on plant growth and development. As such, it can be used without combination with any additional agriculturally or horticulturally beneficial ingredients, such as fertilizers, manures, other plant nutrients, herbicides, fungicides, pesticides, etc.

In another embodiment, Yenomite may also contain, as an additional minor zeolitic component, faujasite, in amounts of up to about 10 wt. %.

In another embodiment, Yenomite can also contain other naturally occurring minerals and compositions, found in the zeolitic layer or brown tuff. These other naturally occurring minerals or compositions can comprise any naturally occurring minerals or compositions contained in the zeolite layer or brown tuff layer.

In another preferred embodiment the Yenomite used in the invention may additionally contain, one or more of olivine, various clay minerals such as smectite, vermiculite, or montmorillonite, calcite, and pyroxene, in a total amount of up to about 20 wt. %. In this embodiment, Yenomite contains phillipsite, chabazite and faujasite in aggregate amounts ranging from about 20 to about 90 wt. %, and minor minerals, such as olivine, clay, calcite, pyroxene, and any other incidental minerals, each in an amount of up to about 30 wt. %.

In another preferred embodiment, the additional minerals or composition comprise one or more materials selected from the group consisting of smectite, calcite, fresh volcanic glass, olivine, pyroxine feldspars, hematite, clay and gypsum. These additional minerals or compositions can be contained in amounts up to about 80 wt % (based on total composition), more preferably up to about 50 wt %.

Phillipsite occurs naturally mainly as colorless, radiating crystal aggregates forming a thin rim on pyroclasts. It also occurs as isolated euhedral stout prisms or rosettes of radiating an dshperulitic crystal forms. The crystals of natural phillipsite are preferably less than 300 $\mu$m in length, more preferably less than about 50 $\mu$m.

Faujasite also occurs naturally, often as colorless, equant and isotropic, isolated and aggregated crystals. The crystals tend to be between 50 and 100 $\mu$m and often grow directly on the vesicle walls in deposits. In many instances, it forms a continuous isotropic rim enclosing palagonite clasts and preceding the crystallization of phillipsite.

Chabazite is more abundant that faujasite and occurs naturally often as transparent, isolated or clustered, equant, rhombic crystals with a rhombohedral cleavage, simple penetration twining and zoning. The crystals generally vary in grain size from several microns up to about 200 $\mu$m.

Palagonite, with its low resistance to chemical weathering due to its amorphous structure as a hydrated glass, contributes the following ions: potassium, magnesium, iron, manganese, calcium, phosphorus, zinc, boron, copper, and chloride. All of these are useful nutrients for plant growth and development.

In a preferred embodiment of the invention Yenomite is mined in a particular area of the Aritayn region of Jordan which contains ore body deposits containing the zeolitic tuff. Mining can be by direct excavation of exposed bedrock or by clearing the thin cover of colluviums of the area ahead of the area to be mined. The mining can be by dry mining with an escavator such as a Bucket Wheel Excavator (BWE) or scraper.

The mined material is subjected to crushing and/or grinding operations, and screened to obtain granules having a desired mesh size range. It may optionally subsequently be subjected to a washing operation to remove agriculturally and horticulturally undesirable $Na^+$ ions, although such a washing operation is not necessary because naturally-occuring Yenomite contains such low levels of $Na^+$ ions that it can be used in agricultural and horticultural applications unwashed.

Yenomite having a mesh size of 6-1 mm, preferably of 5-1 mm, and most preferably of 4-2 mm is used. But material having a mesh size falling with the range of 25-0 mm, including 2-0 mm may also be used.

During processing small quantities of not valuable minerals, coarse zeolitic tuff, tuff and palagonite (clay) may be removed. The resulting material should contain at least about 10 and about 80 wt. %, preferably between about 20 and about 70 wt. %, and more preferably between about 30 and about 50 wt. % of zeolitic material. The material may then be used without further modification or it may be further modified, for example, impregnated with water or a dilute fertilizer, such as 3% ammonium sulfate.

Yenomite provides, in a natural slow-release manner, all of the trace elements required by horticultural and agricultural plants. Accordingly, meshed Yenomite may be used without further formulation or modification in agricultural or horticultural applications in accordance with the invention. In this embodiment advantage may be made of the fact that many nutrients required by the plant are provided by palagonite.

The meshed unmodified or modified Yenomite can be dried and bagged or packaged, or can be used immediately without drying or packaging. For storage capability and handling, it is preferred to dry the blend to a moisture level of less than 25 wt. %, more preferably less than 15 wt. % moisture. The dried blend may then be packaged in any desired amount, including 2, 5, 10, 25, 50 kilogram amounts or in bulk containers in amounts of, for example, 500 to 1,000 kilograms. The amount of each package is not critical and can be determined based upon demand.

If desired, unwashed or washed Yenomite can be further modified. The modification of washed Yenomite can take place prior to or after the drying step. Modification can be by impregnating the Yenomite with additional micronutrients (Cu, Zn, Mn, Mo, and/or B). These micronutrients can be added as inorganic salts. (e.g. sulfates, chlorides), organic salts (e.g. acetates, citrates), chelating agents (e.g. with EDTA, EDDHA), or complexes (e.g. lignosulfonates), either as dry materials or in solution. The modified Yenomite obtained is then preferably dried and optionally packaged.

It is also within the scope of this invention to formulate the Yenomite material with one or more additional horticulturally or agriculturally active inorganic or organic ingredients, such as fertilizers, NPK, ammonium ions (e.g., ammonium sulfate, ammonium phosphate), ferrous sulfate, zinc sulfate, magnesium salts, potassium salts, etc., maintaining at least a content of about 10 wt. %, and preferably from about 30 to about 80 wt. %, of zeolitic material in the overall composition.

Yenomite may also be mixed or impregnated with granular, powdery or liquid formulations of herbicides, fungicides, insecticides, nematicides, seed protectants or any other compounds providing control of or protection against pests.

Yenomite is different from another phillipsite-rich zeolitic material mined in Jordan by the Green Technology Group Jordan (a/k/a GTGJ). For example, the GTGJ material contains very high levels of $Na^+$ ions requiring extensive washing operations to remove sufficient quantities of the agriculturally and horticulturally undesirable $Na^+$ ions from the material to make it suitable for such uses. Yenomite further exhibits a very high CEC.

Yenomite may be used as a soil amendment composition. When Yenomite is used in combination with fertilizers, the amount of fertilizer per application, the number of applications, or both, can be decreased, due to the time release characteristics imparted by the composition and the additional micronutrients provided by the composition. For example, while conventional fertilizer compositions may be required to be applied once a month during the growing season, combining the fertilizer composition with the soil amendment of the present invention can reduce the number of applications required to once every two or three months, or even once per season.

Yenomite in the soil also provides more efficient use of fertilizer. Without Yenomite, nitrogen fertilizer applied to the soil can leach through the soil, past the root system of the plant, and into the environment. Yenomite does not leach through the soil. Situated adjacent to the root system, it captures in its interior structure the ammonium ions released by nitrogen fertilizer, rendering the ammonium unavailable for nitrifying soil microbes. This prevents the formation of nitrate, which would leach further into the soil and eventually below the zone of plant uptake. Instead, Yenomite retains plant-available exchangeable ammonium adjacent to the roots for greatly improved efficient use of the nitrogen fertilizer. At the same time, negative impacts of the release of fertilizer nitrogen into the environment are reduced.

Yenomite may be applied in several ways to suit the different soil conditions, crops and plants grown, and management requirements. The material can be applied to the surface of the soil, either in bands or broadcast, without incorporation for existing plantings such as turfgrass, groundcovers, or ornamental beds. Yenomite can be incorporated into the soil to various depths in the root zone. The zone of Yenomite application may be across the whole field, in bands under or next to the growing crop, or in a subsurface zone of varying thickness and lateral extent. Application and/or incorporation can be achieved with various broadcasting or banding applicators, tillage, or during bedforming operations. The rates for a single application range from 200 lbs/acre to 30 tons/acre. Applications may be made once or repeated for each crop growth cycle.

Yenomite is also useful as a component of man-made plant growth media for use in greenhouses, hotbeds, plant growth containers, and engineered structures such as golf greens and vegetated roofs or buildings. Such growth media may contain Yenomite in specific layers or bands, or as an ingredient throughout, up to about 80% by weight.

Use of Yenomite has been found to result in the production of higher numbers of healthier and larger plants and/or fruits. Crop yields are dramatically increased. For example, in one test on tomatoes, the present invention composition provided tomatoes that were 30–35% larger than tomatoes grown without the present soil amendment.

Any agricultural or horticultural plant can benefit from the use of Yenomite, including, for example, grains (such as barley, corn (maize), emmer, oats, rice (*Oryza* spp.), rye, sorghum, spelt, triticale, wheat, and wild rice (*Zizania* spp.), pulse crops (such as soybean, dry bean, lentil, lupin, and peas), vegetables (such as asparagus, beans, beets, bell peppers, broccoli, cabbage, cantaloupe, carrot, cauliflower, celery, collard, cucumbers & pickles, eggplant, fennel, garlic, honeydew melon, kohlrabi, lettuce, leek, muskmelon, mustard green, onion, green onion, okra, pea, pepper (*Capsicum* spp.), potato, pumpkin, radish, spinach, squash, sweet corn, sweet potato, tomato, turnip, watermelon, yam, and zucchini), fruit trees (such as apple, apricot, avocado, banana, cherry, coconut, grape, grapefruit, lemon, lime, nectarine, olive, orange, peach, pear, plum, prune, tangelo, tangerine, and kiwi), berry plants (such as cranberry, blackberry, blueberry, boysenberry, gooseberry, raspberry, and strawberry plants), nut-bearing plants (such as almond, cashew, hazelnut, pecan, and walnut plants), oil-producing crops (such as canola, cranbe, cottonseed, flax, mustard, peanut, rape, safflower, sunflower plants), grasses (including lawns, pastures, golf courses, turffgrass, and other ground covering plants), ornamental plants (including flowers such as carnations, mums, golden pothos, impatients, pansies, violets, begonias, gardenias, hydrangea, lilacs, sunflowers, orchids, pointsettia, phalenopsis, bromiliad, snapdragons, alstroemeria, gerbera daisies and other daisies, freesia, liatris, antherum, delphinium, roses, lilies, irises, daffodils, hyacinths and tulips), and other crops (such as cotton, pineapple, sugarcane, sugarbeet, tobacco, hemp plants, herbs, shrubs, succulents, vines (including grape vines), ferns, ornamental trees and bushes). All of these are hereinafter referred to as "plants."

Yenomite may thus be advantageously used in conjunction with any agricultural or horticultural applications, in nurseries, in homes lawns, pastures, golf courses, etc. Accordingly, Yenomite can be used in conjunction with any of these plants at any point in their development. The Yenomite can be used in association with seeds corresponding to any of these plants, seedlings, all of the way to mature plants.

Soil moisture and soil fertility are the most limiting factors for agricultural production in arid and semi-arid regions. Due low amounts and poor distribution of rainfall in these regions, soil moisture most of the growing season is below the optimum level for normal growth. Therefore, agricultural crops in these regions often grow under low soil moisture conditions and suffer from drought conditions that sharply decrease agricultural production. Agricultural production in these regions has been relying more and more on intensification of farming systems where irrigation and intensive use of chemical fertilizers are practices.

As noted above, heavy use of chemical fertilizers not only may have a negative impact on the environment, but also increase the cost of production and decrease the farmer's income. Yenomite can be used as a soil amendment that improves physical and chemical properties of the soil in these arid and semi-arid areas, which favorably influence its fertility and productivity and crop production. Yenomite can be used as a source of plant nutrients and as a slow release fertilizer, thus minimizing losses of nutrients by leaching and/or precipitation. This will improve nutrient use efficiency, minimize the use of chemical fertilizers, protect the environment and increase farmer's income.

Yenomite improves the physical conditions of the soil through increasing water holding capacity, improving soil structure and soil aeration and improve root penetration and plant growth as a whole. One of the advantageous uses of Yenomite in agriculture is its application to the soil in agriculture in arid or semi-arid regions of the globe.

The terms "agricultural," "horticultural", "agriculturally cultivated soil," and "horticulturally cultivated soil" are used herein to refer to seed, seedling and/or plant growing operations characterized by the intervention of man, in contrast to any such activities in a natural state untouched by man.

While in a preferred embodiment Yenomite is mined from natural sources, it is also within the scope of this invention to use Yenomite that has been made by man, i.e., by combining together the various ingredients needed to make Yenomite or synthetically produced Yenomite. For example, Yenomite may be prepared by mixing phillipsite and palagonite, in appropriate proportions, using conventional mixing techniques, followed by grinding to desired mesh size and optionally adding one or more agriculturally or horticulturally useful agents to the Yenomite as described above. It is also possible to grind and/or crush each of the components of Yenomite separately to obtain particle sizes having a desired mesh size, washing the ground components, then blending the zeolite and palagonite (from the brown tuff) to the desired ratio.

Yenomite:

The horticultural and agricultural performance characteristics of Yenomite, certain of its chemical and physical properties, as well as where it may be obtained is described below.

Yenomite may be obtained from an area in the Northeastern desert (badia) of Jordan shown in FIG. 1. More particularly, Yenomite may be obtained from the Jabal-Araitayn area in Jordan, which is part of the Neogene Continental Basalt exposed in northeast Jordan, which, in turn, is the northern extension of the North Arabian Volcanic Province that covers a total area of more than 46,000 $km^2$ (from Syria to Saudi Arabia), of which 11,000 $km^2$ are located in Jordan. The province is parallel to the axis of the Red Sea and is truncated at the Dead Sea-Gulf of Aqaba Transform Fault. A detailed analysis of the phillipsite-bearing volcanic rock found in this region has been published by I. M. Dwairi in Dirasat, vol. 19B, no. 1, 1992, pp. 23–44, which is incorporated herein by reference.

Geological mapping of this basaltic province in Northeastern Jordan has been subdivided into five groups belonging to the Harrat Ash Shaam Basaltic Super-Group. The super group represents a classic intro-plate continental basaltic succession of the alkali alivine basalt series with ages, based on K/Ar dating method, ranging from 13.7 Ma to less than 0.5 Ma.

The volcanic rocks in the general area (Harra Al-Jabban) crops out in the following forms: Basaltic flows, Vocanic cones, Volcanic ridges and Basaltic flows. The cones are the most obvious landmarks in the region. About 80 eruptive centers occur in the general area. The centers were distributed in two volcanic fields: Rimah volcanic field and Ashqaf volcanic field.

Jabal-Ariatayn, which is situated in the middle of the Remah volcanic field, is classified as composite cinder volcano, consisting of two separate, contiguous cones occurring along a fissure system trending North-South. Ariatain area has geological importance for some important industrial minerals: speciality zeolitic tuff and pozzolanic tuff. Its center is more than 800 m high, overall symmetrically shaped with steeply dipping pyroclastic deposits. The volcaniclastic successions consist of thick air-fall scoria occasionally intercalated with very thin basaltic flows and basaltic.

The formation consists of stratified, sorted, poorly cemented air-fall tuff, volcanic bressia and agglomerate, which are rarely intercalated with short lived lava flows from a central vent. Lithologically, it is made up of ash, angular and spherical lapilli, basaltic blocks as well as volcanic bombs of different sizes and shapes cemented either by carbonate or zeolites and carbonate, or in some cases welded together: these resulted from intermittent eruptions, giving rise to dissimilar vocaniclastic successions. The volcaniclastic layers are arranged in shower bedding maintaining a uniform thickness and exhibits laminations, reverse or normal grading with particles sizes from 1 mm to 200 mm, welding, diverse clast types and morphology. Reportedly, sometimes a 1 mm thick oxidation zone on top of the layers occurs in places on Jabal Aritayn possibly related to weathering between periods of eruptions.

Baslatic sills/flows of variable thickness are intercalated in the volcaniclastic sequence. Field examination indicate the presence of local variation in grain size, packing and welding of the pyroclastic which are responsible for local variations, porosity and permeability of the rock. A variety of bombs and blocks are found including large scoriaceous fragments, less well vesiculated lava having spindle and cowpat shapes, sometimes bombs with bread-crusted surfaces, and dense lava blocks. Accessory lithics of country rocks and petrlogically important mantle derived xenoliths occur as well, representing the crust and mantle composition beneath Jordan.

Figure 8:
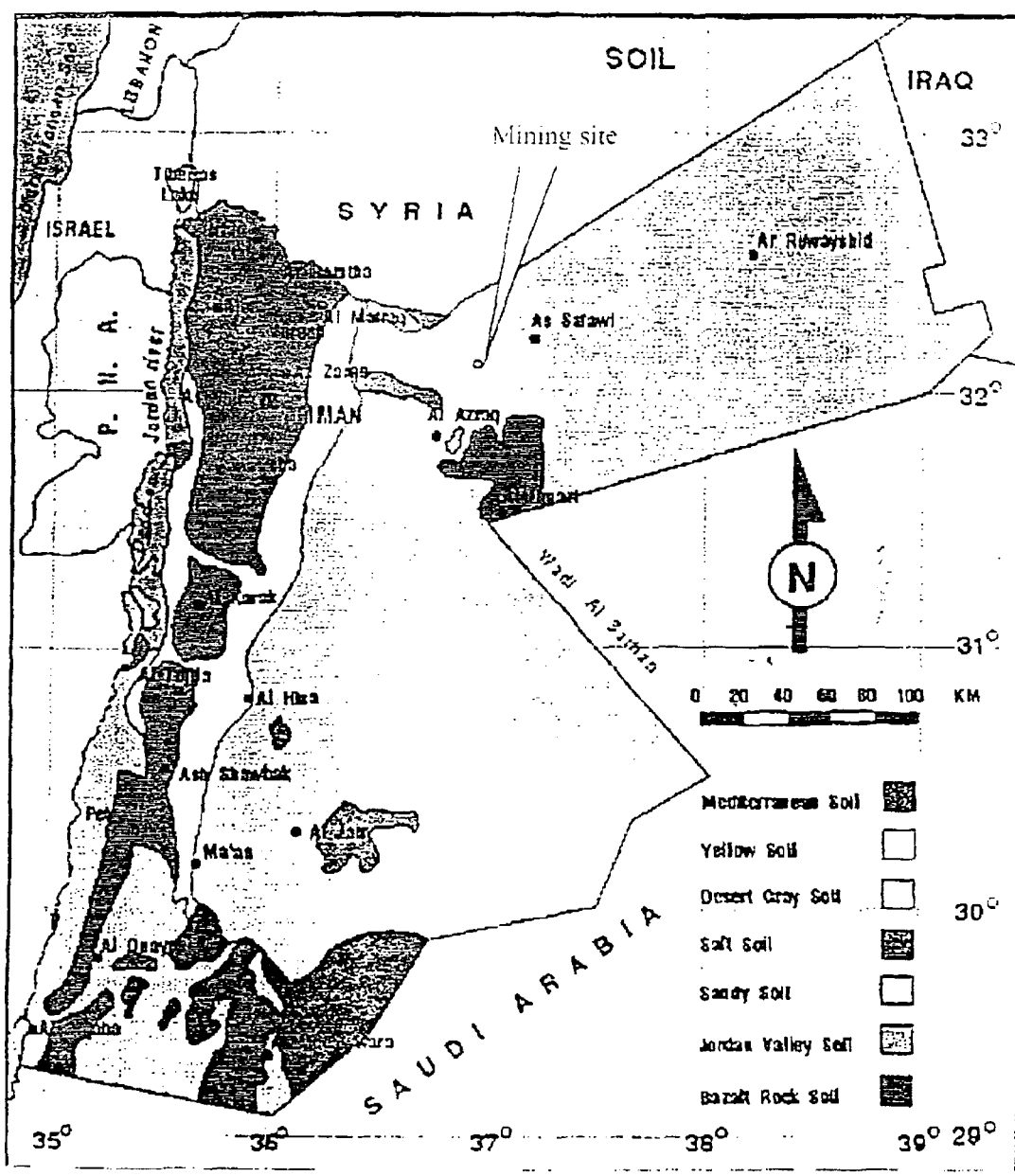
FIG. 8 is a soil map of Jordan showing the location of a site from which Yenomite may be obtained.
Figure 9:
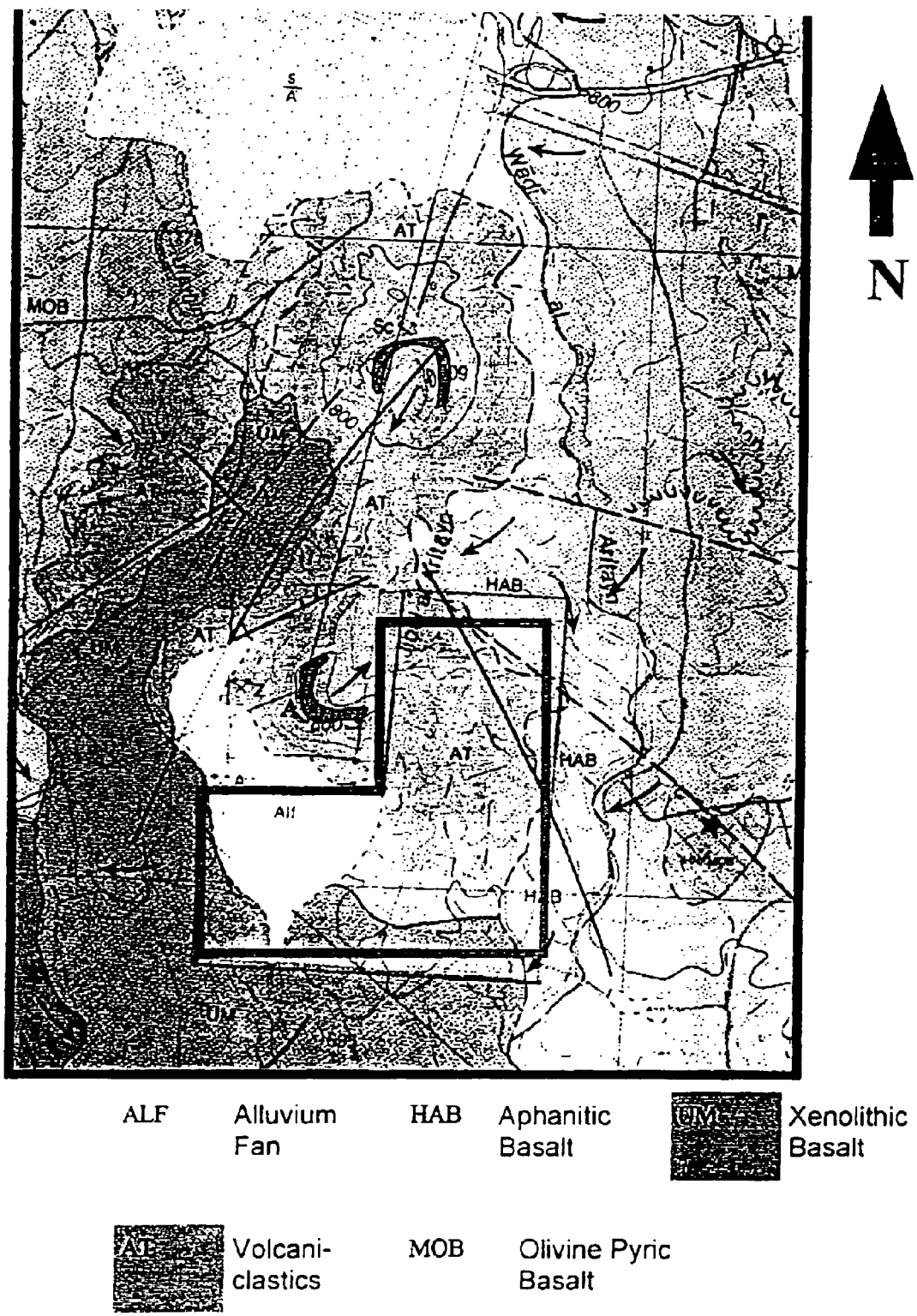
FIG. 9 is a geological and superficial map showing the location of the site from which Yenomite may be obtained.
Figure 10:
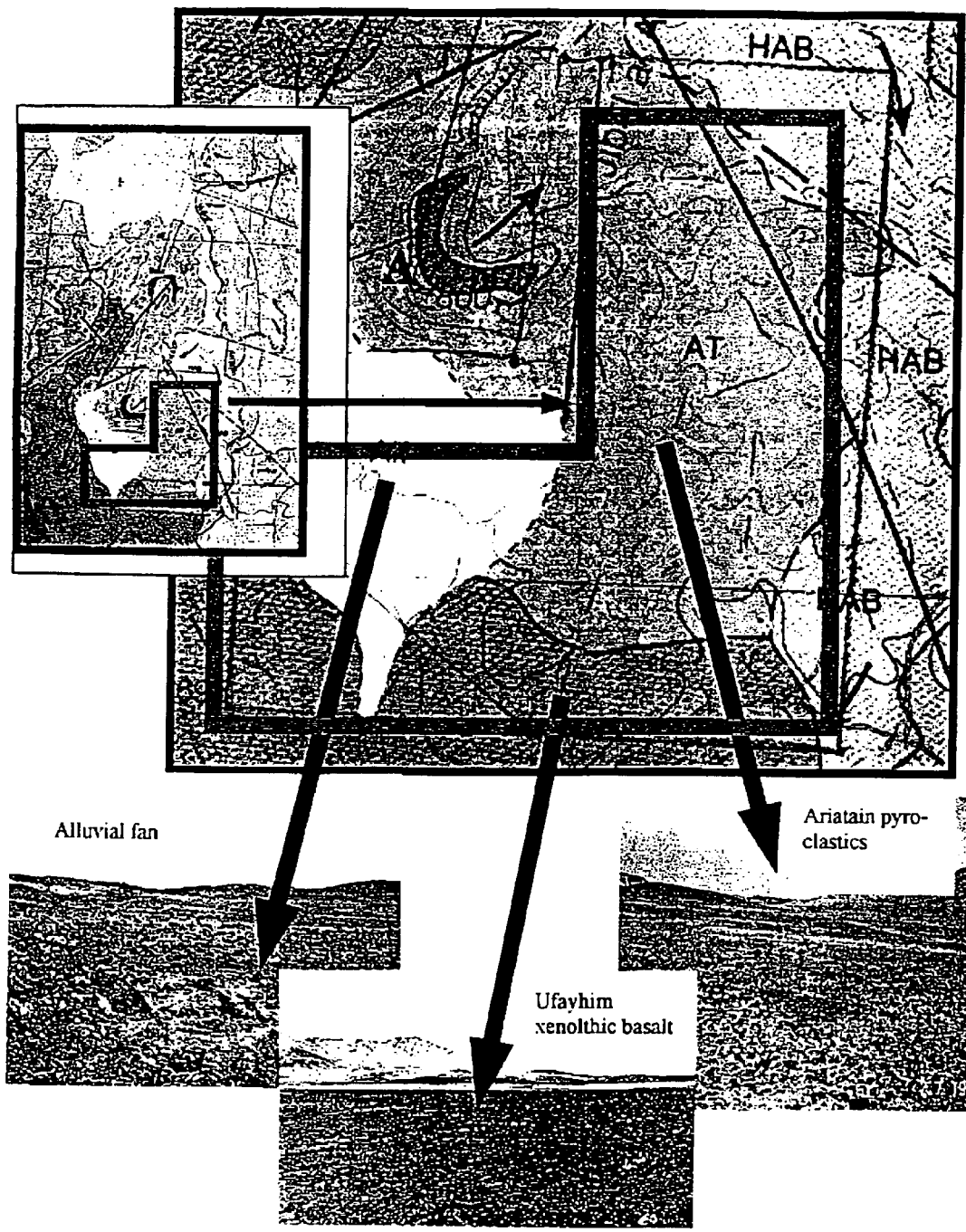
FIG. 10 is a superficial map showing the type of soil which covers the site from which Yenomite may be obtained.

Geological studies on the southern and southeastern 5.935 km² parts of the volcanic edifice located within the coordinates shown in Table 1 below, where Yenomite may be found, provided the following information. (FIGS. 8, 9 and 10 provide additional information about the location of the site whose coordinates are shown in Table 1.)

|   | North | East |
|---|---|---|
| 1. | 168.500 | 327.050 |
| 2. | 168.500 | 328.350 |
| 3. | 168.500 | 328.350 |
| 4. | 168.500 | 325.700 |
| 5. | 166.960 | 325.700 |
| 6. | 166.960 | 327.050 |

The Cenozoic continental basalt exposed in northeast Jordan are the northern extension of the North Arabian Volcanic Province, which covers in Jordan about 11,000 km² and defined as Harrat Ash Shaam Basaltic Super-Group. Three rock units of the super-group are exposed in the study area (Table 2). The super-group represents a classic intra-plate continental basaltic succession of the alkali olivine basalt series with ages based on K/Ar dating method ranging from 26 Ma to less than 0.5 Ma.

TABLE 2

Stratigraphic units of the Harrat Ash-Shaam Basaltic Super-Group exposed in the study area
Harrat Ash-Shaam Basaltic Super-Group

| Formation | Group | Age (Ma) |
|---|---|---|
| Aritayn Volcaniclastic | Rimah | 2.94–2.01 |
| Hashimyya Aphanitic Basalt | Asfat | 5.0–2.0 |
| Ufayhim Xenolithic Basalt | | |

The al Aritayn area has a geological importance as a prospective area for some important industrial minerals, specially zeolite tuff and pozzolanic tuff. Therefore it has been subjected to detailed geological, studies including mineral evaluation, characterization and mineral processing studies aiming mostly to investigate the economic potentiality of the zeolitic tuff and its possible uses in agriculture, industrial and municipal wastewater treatment.

To explore the zeolite body and obtain representative disturbed and core samples, a heavy duty truck mounted with a drilling machine, type Central Mine Equipment (CME 75) was employed for this study. Continuous core drilling was used to obtain representative samples. The core barrel employed was double tube with split inner. Air flush system was used by employing Joy 450 CFM compressor. In most cases a loss of the drilling air flush was observed due to Cavernous nature of the Tuff rock. In case of very low or no core recovery, representative disturbed samples were obtained for laboratory testing.

The drilled boreholes were selected and a qualified and certified surveyor plotted the drilled boreholes on the map and determined the coordinates and elevation of each borehole. The property boundaries were also determined and fixed on the ground property.

To determine the chemical composition of the ore body, representative samples were obtained for laboratory testing 114 samples were tested for Cation Exchange Capacity, 65 samples for X-Ray Diffraction and 60 samples for chemical analysis.

The drilling results show that most of the ore body is mainly Tuff partly altered to zeolite. The investigated samples were analyzed for the flowing major oxides $SiO_2$, $Al_2O_3$, $CaO$ and $K_2O$ using previously described methods. $K_2O$ was determined using a flame photometer type Eppendorf 700, whereas, the other oxides were analyzed using the Atomic Absorption Spectrophometer model Perkin Elmer 2280 with the acetylene, and nitrous oxides flame. The chemical analysis was carried out in the Geology Department of the University of Jordan and the Yarmouk University.

Mineral identifcation was aided by X-ray diffraction (XRD) analysis. It was carried out using X Pert MPD-Philips X-ray diffractometer by Co K radiation hosted in the Natural Resources Authority. Zeolite content was calculated using an X-ray diffraction method based on X-ray analyses of standard zeolite samples separated from the volcanic tuff and constructing a calibration curve from the obtained data to calculate the total zeolite. The correlation coefficient and standard deviation for the standard curve were 0.9939 and ±3.60 respectively.

The cation exchange capacity (CEC) was calculated by determining the $Na^+$ concentration of supernatant liquid extracts, using 1.0N sodium and ammonium acetate solutions with 95% ethanol.

Ufayhim Xenolithic Basalt Formation (UM): The formation was erupted from Jibal al Aritayn volcanoes and flooded westwards and southwards. The formation typically displays well-developed columnar jointing and closely spaced horizontal jointing, which appear as thin laminations. The ground surface-cover is very smooth, dark brown to black in color with an average clast size of less than 10 cm diameter.

At the out crop, the formation is 15 to 25 meters thick. It is typified by containing large quantities of mafic inclusions sometimes forming up to 60% of the outcrop. They vary in size from 1 cm up to 10 cm, and are rounded with brownish reaction rims, comprising mainly granular, orange, olive brown olivine and lesser amounts of dark green tabular pyrozene.

Under the microscope, the Ufayhim Basalt is porphyritic to microporphyritic, hypocrystalline to holocrystalline, fine- to very fine-grained, melanocratic olivine phyric basanite to nephline basanite. Olivine phenocrysts makes about 15%, occurring in euhedral to subhedral, iddingsited crystals. The groundmass comprises plagioclase microlites and crystallites, pyroxene, Fe-Ti oxides, K-feldspar and volcanic glass.

Hashimyya Aphanitic Basalt (HAB): The formation is exposed to the east of the volcanic center, occurring along Wadi al Aritayn. It typically displays columnar jointing with less developed horizontal jointing. The ground surface-cover is smooth, dark brown to black in color and about 10 cm diameter clast size. The formation is characterized by the presence of volcaniclastic deposits underneath.

The formation is less than 15 m thick comprises thin flow units, mostly between 3 m and 5m thick each. It is aphanitic, uniform, inequigranular to equigranular, hypocrystalline to holocrystalline, but olivine phyric in part. The formation is melanocratic, bluish-gray to medium-dark gray, very fine-grained with microporphyritic textures.

Petrographic investigation revealed that olivine microphenocrysts make up to 20%, which occur in two generations. The occasional plagioclase and clinopyroxene microphenocrysts are also equant, anhedral to subhedral and fine-grained (c. 0.5 mm). The microcrystalline groundmass comprises acicular microlites of plagioclase, coffee-brown to purple-brown augite, iddingstized very fine-grained olivine, and minute equant grains of Fe-Ti oxides.

Aritayn Volcaniclastic Formation (AT)—Morphology: The type area of the Aritayn Volcaniclastic Formation is Jibal al Aritayn. It is developed from symmetrical, composite cinder stratovolcanoes built by steeply dipping pyroclastic deposits occasionally interbedded with short lived lava flows, where the pyroclastic are the most important volumetrically, make up more than 90% of the succession. The formation consists of bedded, poorly cemented air-fall tephra, which is typified by its stratified form and typically cavernous. It is characterized by a smooth ground cover surface. The weathering color is variable, mostly between black, purplish black, brown, red brown and gray. The boulder cover is mainly from the pyroclasts mixed with basaltic boulders.

Lithology: The formation consists of stratified, sorted, poorly cemented air-fall tuff, volcanic breccia and agglomerate. Lithologically, it is made up of ash, angular and spherical lapilli, basaltic blocks as well as volcanic bombs of different size and shapes, which are cemented either by carbonate or zeolites and carbonate. They were resulted from intermittent eruptions, giving rise to dissimilar volcaniclastic successions, but their overall character is comparable. The volcaniclastic layers are arranged in shower bedding maintaining uniform thickness and exhibit laminations, reverse or normal grading with particle size from 1 mm to 200 mm, welding, diverse clast types and morphology. Field examination indicate the presence of local variation in grain size, packing and welding of the pyroclasts which are responsible for local variation in porosity and permeability of the rock.

A verity of bombs and blocks are found including scoriaceous fragments, less well vesiculated lava having spindle and cowpat shapes, and dense lava blocks. Accessory lithics of country rock and petrologically important mantle derived xenoliths occur as well, representing the crust and mantle composition beneath the volcanic center.

Detailed field investigation of the Aritayn Formation indicate the presence of the vertical zonation. The zonation is defined with respect to the degree of alteration of volcanic glass to a reddish-brown colored palagonite. It begins from a surface zone "Zone 1" contains a relatively fresh volcanic glass to a zeolite zone "Zone 3", with an intermediate zone of palagonite which is almost free of zeolite "Zone 2". These three "Zones" are shown as (1), (2) and (3) in FIG. 1. At out crop, the zones can be recognized by their distinctive weathering colors. In detailed, Zone 1 consists mainly of massive and thick layers of welded agglomerates, welded lapilli tuff alternated with tephra laminae, all of which contain nearly fresh volcanic glass and sometimes cemented by carbonate. Due to local variation in permeability, Zone 1 is variable in thickness from 10 m–40 m. It is distinguished by black to light gray color. Zone 2 is 10 m to 20 m thick, comprises palagonitized tuff composed of badly soiled lapilli and sometimes scoria blocks, and is characterized by dark brown to reddish brown colors. Zone 3 is the zeolitic zone, where the pyroclasts are cemented by a colorless to white coating of zeolite and calcite. It displays distinctive yellowish light brown color. The degree of zeolitization is not uniform. The highly zeolitized areas contain soft and friable highly altered lapilli clasts cemented by a thick coating of zeolite and calcite. In a few cases, zeolite bearing lenses and/or bands follow the joints system may occur within Zone 2.

Description of the Other Phases:

(1) Volcanic Tephra: The volcanic tephra comprises massive, poorly cemented lapilli vitric tuff to coarse vitric ash tuff. The cementing material, if present, consist essentially of zeolite and calcite. Clasts are usually sub-angular, and less than 5 mm in grain size with poor packing. In addition to fresh and palagonitized volcanic glass, the tuff contains lesser amounts of crystal shards and lithic clasts. The lithic clasts consist of dark brown, microcyrstalline, olivine phyric basalt, upper crustal inclusions and ultramafic xenoliths.

(2) Fresh Volcanic Glass: It comprises greenish light brown, hypohyaline, texturaly uniform and smooth groundmass with fresh olivine phynocrysts or needles. Curved pereletic cracks are exploited by dark brown to black staining. Vesicles are mostly rounded, but with different sizes. They are sometimes encrusted by calcite rim.

(3) Smectite: Smectite occurs as colorless rim fringing palagonite granules or encrusting vesicles wall with gloubular "corn-flacks" like cluster. Thickness of the fringe varies from 0–40 m.

(4) Calcite: It represents the latest phase of authigenic minerals, occurs in the form of rim and blocky cement, filling central parts of vesicles and the inter-granular space.

Results of X-ray Diffraction:

Zeolite Minerals: X-ray diffraction study indicate that phillipsite is the most abundant zeolite mineral occurs in all of the analyzed samples in Zone 3. In many cases, it is the only zeolite phase present in the sample, otherwise it occurs with either faujasite or chabazite. The total zeolite content of the study samples is shown in Table 3. It varies between 2.5% and 55%. As it is obvious from Table 4, boreholes BH17, 18, 25, 28 and 29 have an average zeolite content >30%, whereas boreholes BH13, 19, 23, 33, 38 and 40 contain zeolite from 20%–30%. On the other hand, 12 boreholes of an average zeolite content between 10%–20%, these are BH7, 9, 12, 21, 22, 24, 27, 30, 35 and 36. The rest of the boreholes have zeolite content of less than 10% as shown in Table 4. The results of the X-ray Diffraction tests results are summarized below:

| Sample No. & Depth | Q | Cc | Au | F | Ph | He | Sm | G | An | Ch | Fa |
|---|---|---|---|---|---|---|---|---|---|---|---|
| BH.1 (3.0–3.5) | — | ** | *** | ** | — | * | * | * | | | |
| BH.1 (5.5–6.0) | — | ** | *** | ** | * | * | * | — | | | |
| BH.1 (7.5–8.0) | — | ** | *** | *** | * | * | — | — | | | |
| BH.2 (0.5–1.0) | ** | *** | — | ** | — | * | * | *** | | | |
| BH.2 (2.0–2.5) | ** | ** | — | * | — | * | * | *** | | | |
| BH.3 (0.5–1.0) | ** | ** | — | * | — | * | * | *** | | | |
| BH.3 (4.5–5.0) | * | *** | ** | ** | * | * | — | * | | | |
| BH.7 (4–4.5) | *** | ** | — | ** | * | * | * | | | | |
| BH.7 (5.5–6) | *** | ** | — | ** | * | * | * | | | | |
| BH.9 (6–7) | — | * | *** | *** | * | ** | * | | | | |
| BH.9 (1) | — | * | *** | *** | ** | ** | * | | | | |
| BH.9 (9–10) | — | * | *** | *** | * | ** | * | | | | |
| BH.10 (4–5) | — | * | *** | ** | * | ** | — | | | | |
| BH.10 (8–9) | — | * | *** | *** | — | * | — | | | | |
| BH.10 (12–13) | — | * | *** | ** | * | * | * | | | | |
| BH.11 (0.5) | — | * | *** | *** | * | ** | * | | | | |
| BH.11 (4–5) | * | * | *** | *** | * | ** | * | | | | |
| BH.11 (7.5–8.5) | — | * | *** | *** | * | ** | * | | | | |
| BH.12 (2.0) | — | *** | ** | * | ** | * | | — | — | — | |
| BH.12 (8.0) | — | *** | *** | * | ** | * | | — | — | * | |
| BH.13 (2.0) | * | *** | *** | * | ** | * | * | * | | — | |
| BH.13 (7.5) | * | *** | ** | * | ** | * | * | * | | — | |
| BH.17 (4.5) | * | ** | *** | * | * | * | | — | — | — | |
| BH.17 (7.0) | *** | * | ** | * | * | * | | — | — | — | |
| BH.17 (10.0) | ** | * | *** | ** | * | * | | — | — | — | |
| BH.18 (1.5) | *** | * | ** | ** | * | — | | — | — | — | |
| BH.18 (3.0) | ** | * | *** | ** | * | — | | — | ** | — | |
| BH.19 (10.0) | — | *** | *** | ** | ** | * | | — | — | — | |
| BH.19 (18.5) | * | *** | *** | ** | ** | * | | — | — | — | |
| BH.19 (4.0) | * | *** | *** | ** | ** | * | | — | — | — | |
| BH.20 (4.5) | ** | *** | *** | * | ** | * | | — | — | — | — |
| BH.20 (12.0) | ** | *** | *** | * | ** | * | | — | — | — | — |
| BH.21 (3.0) | * | *** | *** | ** | ** | * | | — | | — | — |
| BH.21 (10.0) | * | *** | *** | * | ** | * | | — | | — | — |
| BH.22 (1.5) | * | *** | *** | ** | ** | * | | — | | — | — |
| BH.23 (4.5) | * | *** | *** | * | ** | * | | — | | — | — |
| BH.23 (12.0) | * | *** | *** | ** | ** | * | * | — | | — | — |
| BH.24 (5.0) | *** | * | ** | * | * | — | | — | | — | * |
| BH.24 (9.0) | ** | * | *** | ** | * | — | | — | | — | * |
| BH.25 (6.0) | * | *** | *** | ** | ** | * | | — | | — | * |
| BH.25 (10.0) | — | ** | *** | ** | ** | * | | — | | — | * |
| BH.25 (18.0) | — | *** | *** | ** | ** | * | | — | | — | — |
| BH.26 (7.5) | ** | *** | * | * | * | — | | — | | — | — |
| BH.26 (15.0) | ** | *** | * | * | * | — | | — | | — | — |
| BH.27 (4.0) | * | *** | *** | * | ** | * | | — | | * | — |
| BH.27 (14.0) | * | *** | ** | * | ** | * | | — | | * | — |
| BH.27 (18.0) | — | *** | ** | * | ** | * | | — | | ** | — |
| BH.28 (3.0) | ** | *** | *** | ** | * | — | | — | | * | — |
| BH.28 (7.5) | * | *** | *** | ** | ** | * | | — | | * | — |
| BH.29 (3.0) | * | *** | ** | *** | ** | * | | — | | * | — |
| BH.30 (3.5) | ** | *** | *** | * | ** | * | | — | | * | — |
| BH.32 (2.0) | * | *** | *** | * | ** | — | | — | | | — |
| BH.32 (10.0) | * | *** | *** | * | ** | * | | — | | | — |
| BH.33 (4.0) | * | *** | *** | ** | ** | * | | — | | | — |
| BH.33 (12.0) | * | *** | ** | * | ** | * | | — | | | — |
| BH.34 (5.0) | * | *** | *** | * | ** | * | | — | | | * |
| BH.35 (7.0) | * | *** | ** | ** | ** | * | * | | | | * |
| BH.36 (4.0) | * | *** | *** | * | ** | * | | — | | | * |
| BH.38 (5.0) | * | *** | *** | ** | ** | * | | — | | | — |
| BH.38 (11.0) | * | *** | *** | ** | ** | * | | — | — | | * |
| BH.40 (9.0) | — | *** | *** | * | ** | * | | | * | | — |
| BH.41 (1.5) | * | *** | *** | ** | ** | * | | | — | | |
| BH.41 (4.5) | — | *** | * | * | ** | ** | | | — | | |

-continued

| Sample No. & Depth | Q | Cc | Au | F | Ph | He | Sm | G | An | Ch | Fa |
|---|---|---|---|---|---|---|---|---|---|---|---|
| BH.45 (4.5) | | — | *** | ** | * | ** | * | | | — | |
| BH.45 (9.0) | | * | *** | ** | * | ** | * | | | — | |

Note:
Q = Quartz
Cc = Calcite
Au = Augite
F = Feldspar
Ph = Phlipsite
He = Hematite
Sm = Smectite
G = Gypsum
An = Anhydrite
Ch = Chabazite
Fa = Faujasite
Major: ***
Minor: **
Trace: *

FIGS. 2, 3, 4, 5, 6, and 7 provide X-ray spectra of different samples of mined Yenomite samples. The table below sets out approximate mineral weight percentages of various constituents of the samples of FIGS. 2–7 as determined by X-ray diffraction analysis.

Figure 2:
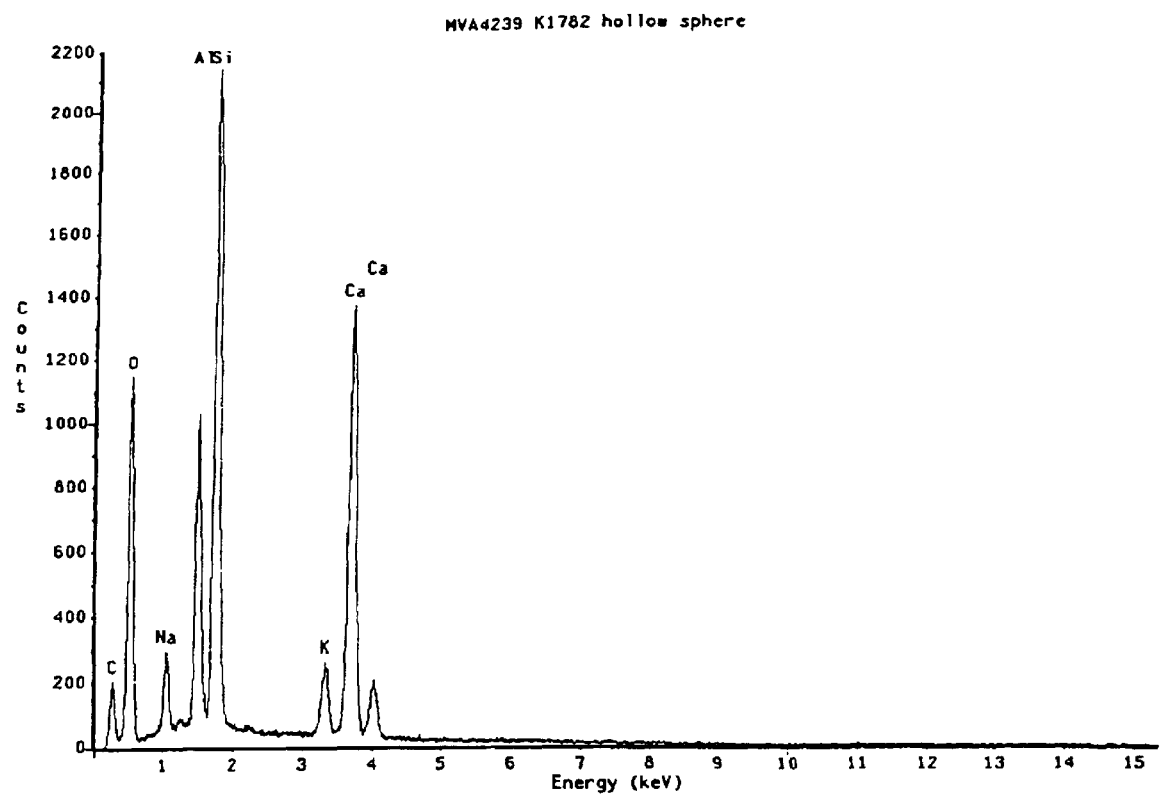
FIGS. 2 to 7 provide X-ray spectra of various Yenomite samples.
Figure 3:
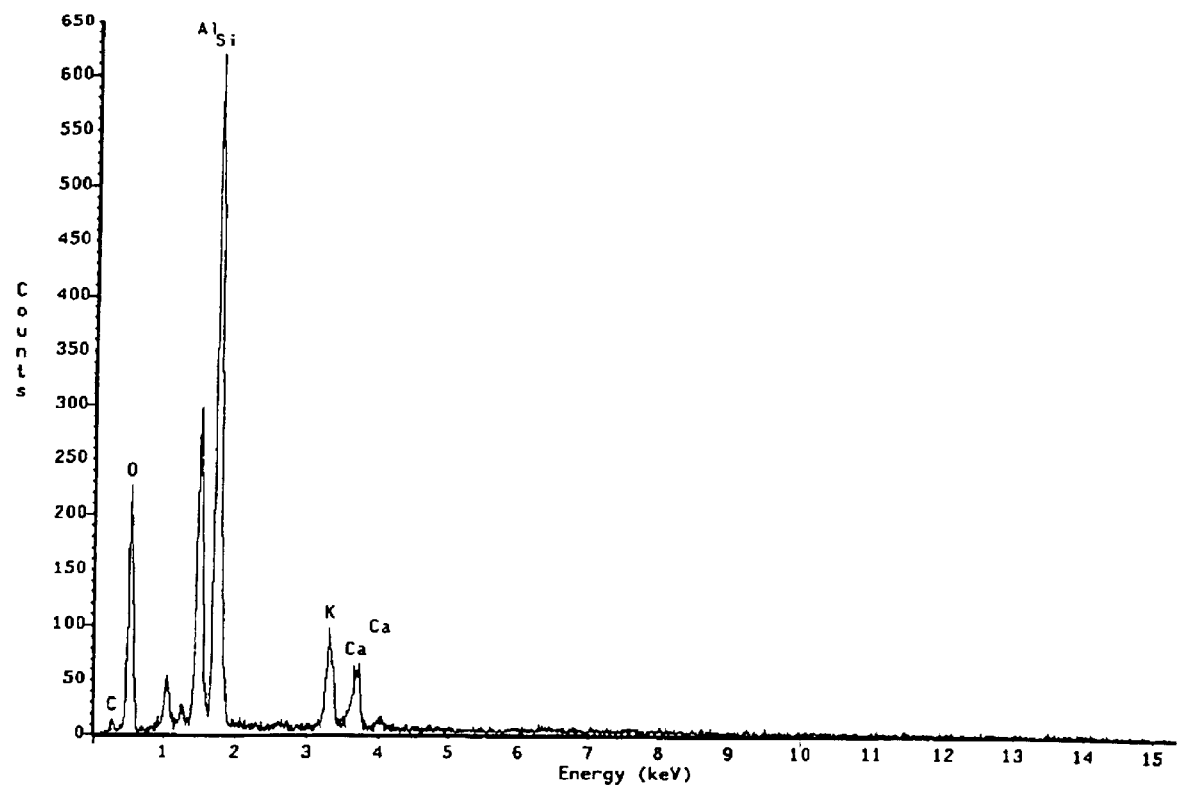
Figure 4:
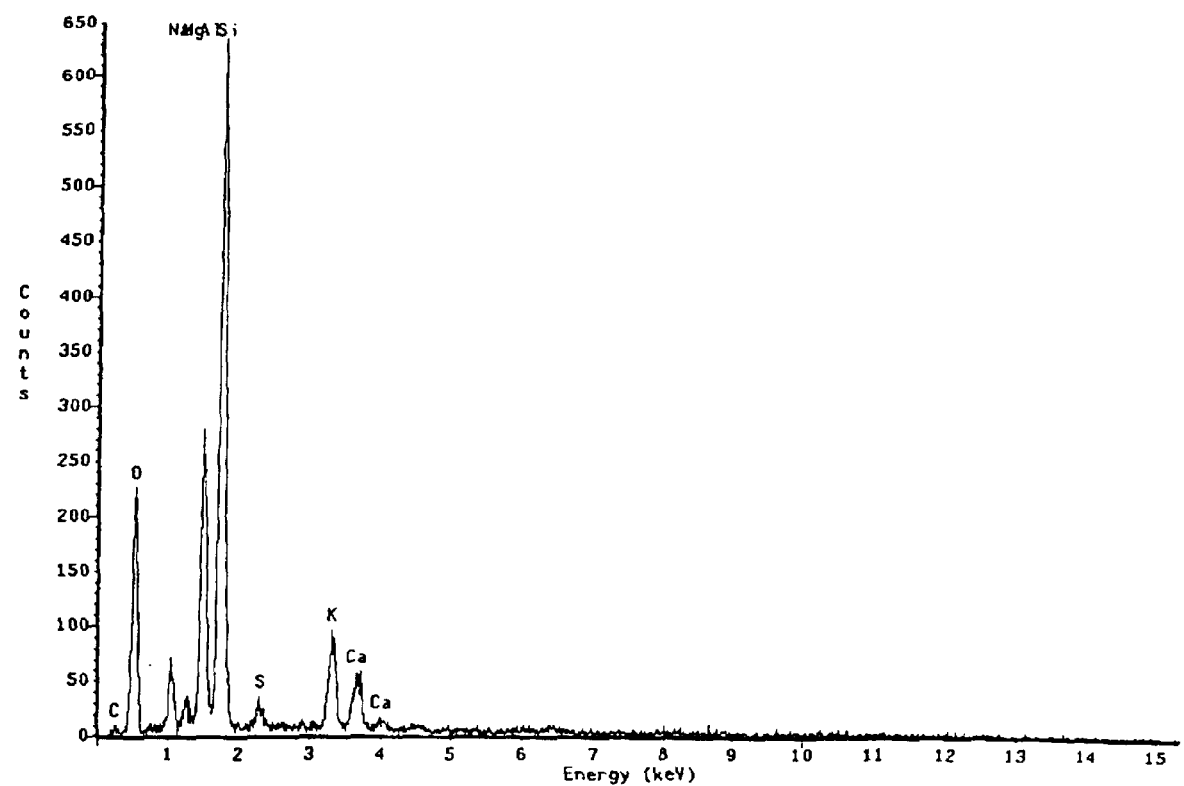
Figure 5:
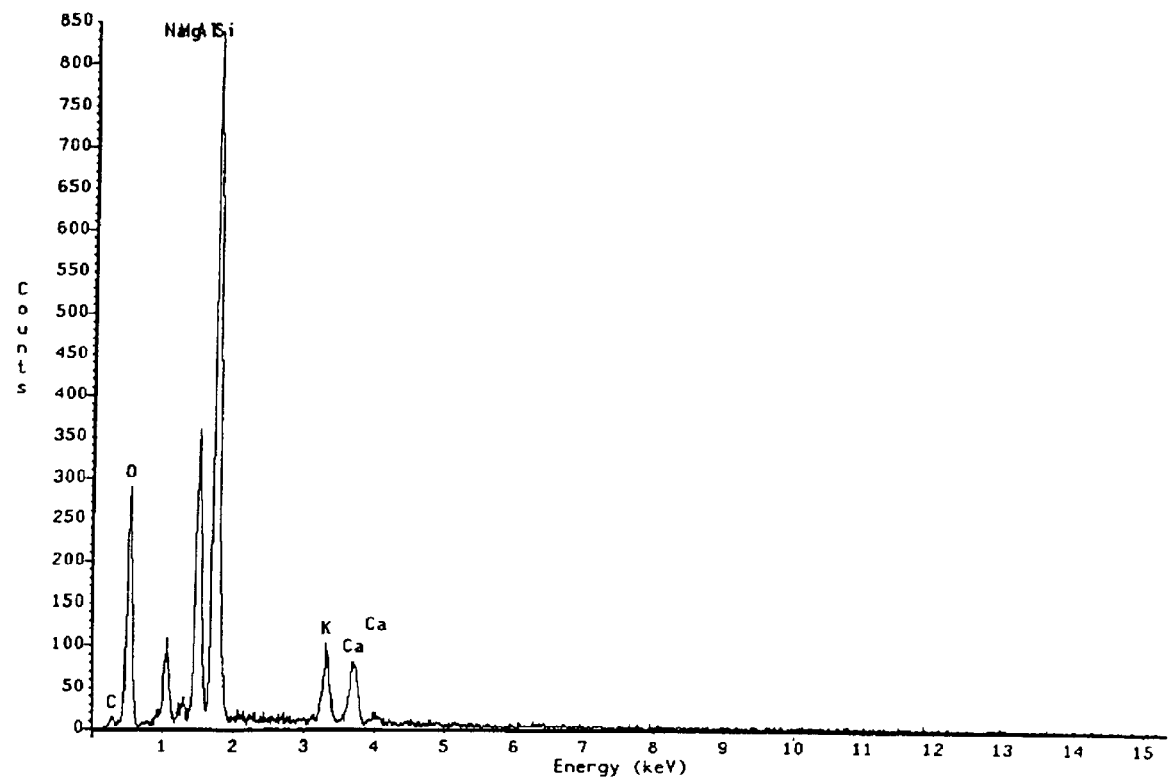
Figure 6:
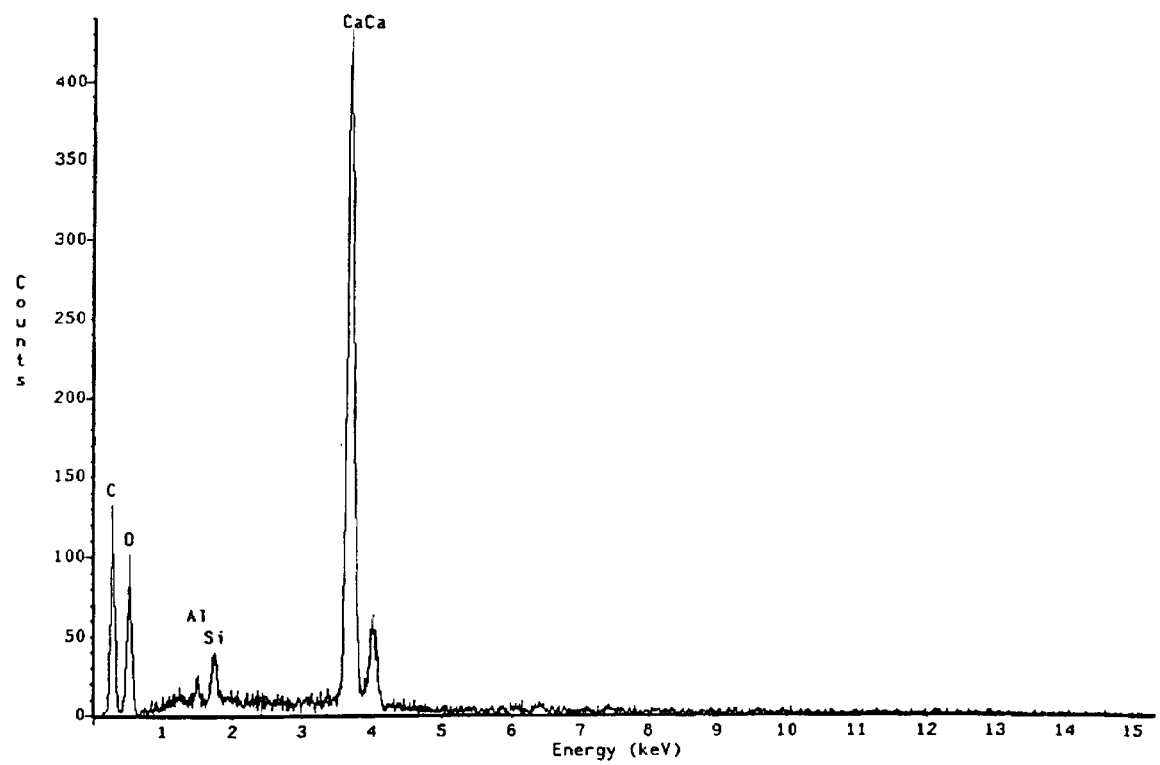
Figure 7:
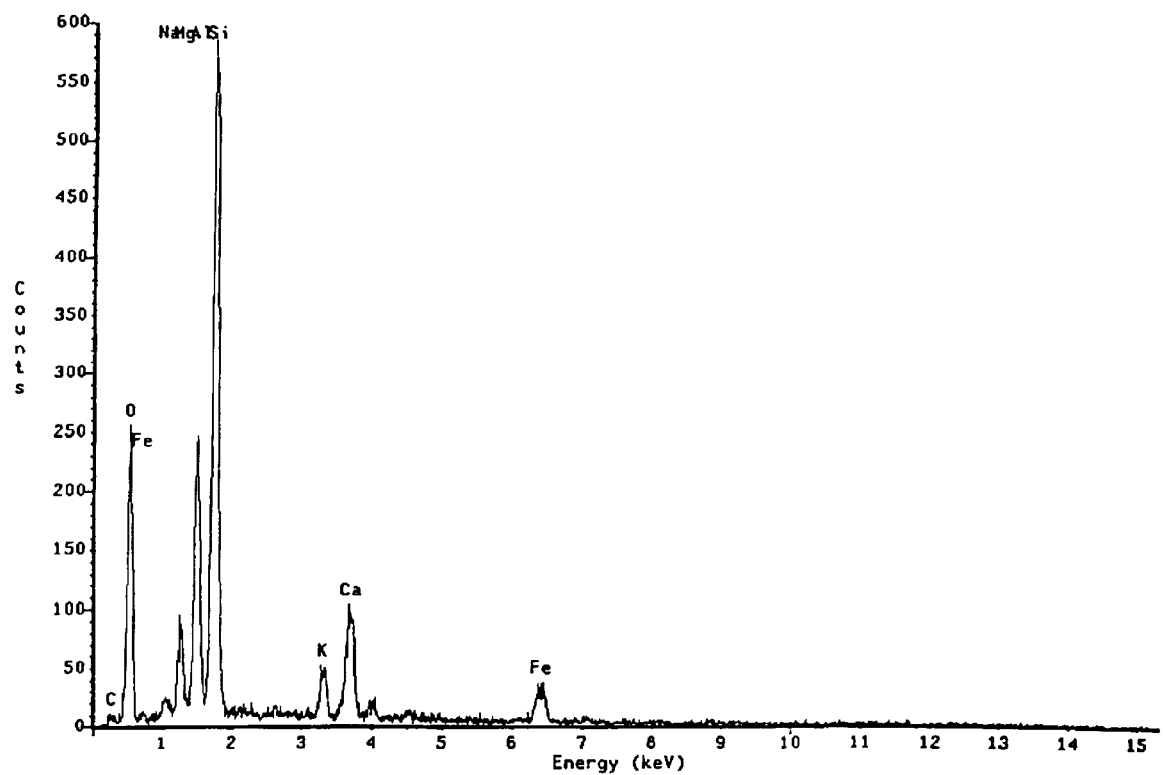

| Phase | FIG. 2 K1782 | FIG. 3 K1783 | FIG. 4 K1784 | FIG. 5 K1785 | FIG. 6 K1786 | FIG. 7 K1787 |
|---|---|---|---|---|---|---|
| Phillipsite | 41 | 37 | 38 | 38 | <2 | 33 |
| Calcite | 6 | 3 | 2 | 2 | — | 13 |
| Fosterite | 18 | 7 | 7 | 8 | 13 | 21 |
| Hematite | 8 | 6 | 9 | 10 | <2 | 7 |
| Augite | 5 | 9 | 10 | 15 | 16 | 4 |
| Smectite | — | 12 | 5 | 3 | — | 3 |
| Gypsum | — | — | 7 | — | — | — |
| Amorphous | 20 | 23 | 20 | 23 | 65 | 17 |
| Unaccounted | <5 | <5 | <5 | <5 | <5 | <5 |

Other Constituents: Smectite was recognized as an accessory phase, which is restricted to Zone 2 and Zone 3. Calcite occurs almost in all of the analyzed samples in all of the diagenetic zones. The other identified constituencies include olivine, pyroxene feldspars and traces of hematite and gypsum.

Thickness of Zeolite Bearing Zone & Reserve: The thickness of the zeolite zone is variable between 2 m and 12 m. The contact roughly follows the topography and cuts across stratification. Table 3 illustrates the thickness of the zeolite zone in the study area. The total area of the zeolitic Tuff is 288004 $m^2$ with an average thickness of 8.2 m. Thus the reserve is 4,247,472 Tonnes.

Results of Chemical Analyses: Chemical analysis results provide clues to the degree of palagonitization and formation of zeolites. Fresh alkali basaltic volcanic tuff containing between 45–52 wt. % of $SiO_2$, and up to 12 wt. % of CaO. The palagonitization-zeolitization processes cause depletion of $SiO_2$. CaO usually enriched as a result of formation carbonates due to weathering. Data obtained indicates that many samples are away from the above-specified range of $SiO_2$ and CaO. It also indicates they have a wide variation in their major oxides, this is an evidence of wide range in degree of zeolitization. The cation exchange capacity (CEC) of the tested samples show a range between 0.90–2.5 meq/g.

Illustrative examples of how mined Yenomite may be manufactured are provided in Jordanian patent no. 1852 to I. M. Dwairi from which the processing description below is taken.

Production of Yenomite tuff from raw volcanic tufaceous materials of all types, colors and shapes: Generally speaking, Yenomite is produced in a first stage in which the mined material is crushed, ground and screened to obtain fine granules of raw material which can optionally be washed with water and/or impregnated. This is followed by further stages which correspond to one or more of the followings operations: i) saturation, cation exchange impregnation using any concentrated solution of cations to produce Yenomite soil conditioner (fertilizer) or Yenomite filter for the treatment of waste water; ii) direct use of Yenomite or washing of the Yenomite with water or impregnation of the Yenomite to produce different types of Yenomite; iii) mixing or mixing with drying (at different temperatures) to produce Yenomite fertilizer, Yenomite tuff with animal manure (either treated or not treated) to produce Yenomite manure; and/or iv) heating at temperature not to exceed 270° C. to produce Yenomite as a drying agent. Finally the material is packaged.

In the first stage a raw material is obtained by mining and preparation of either zeolitic tuff or normal tuff (called sometimes pazolana). This stage may be accomplished by the following steps: i) removing overburden and cleaning the surface of the area to be mined of soil and other debris; ii) mining and production of raw material using bulldozers or any other suitable equipments; iii) crushing, grinding and screening the material using different types of crushers or grinders, and different types of screening equipment to obtain material having the desired mesh size of, for example, a mesh of below 2 mm, below 4.0 mm, below 3 mm, or below 5 mm or any other size desired. It is, of course, also possible to produce a material having a larger mesh of, for example, between 5 and 15 mm.

Next the material may be washed with water and/or subjected to cation exchange to produce Yenomite bearing added fertilizer (slow release) or Yenomite for use as a filter. This process is carried out either by passing through or mixing with water or a concentrated solution of, for example $NH_4^+$, or any other desired soluble material or combination of materials which is to be impregnated into the zeolite structure, a layer of meshed zeolitic tuff granules, so as to exchange the cations in the raw zeolite ($Na^+$, $Ca^{+2}$) with one or more other cations, such as $NH_4^+$, iron, zinc, manganese etc, which are present in the concentrated solution.

Such exchange mechanism proceeds according to the following illustrative equations:

$$Na^+_{(zeolite)} + NH_4^+_{(solution)} = NH_4^+_{(zeolite)} + Na^+_{(solution)}$$

$$Ca^{+2}_{(zeolite)} + Fe^{+2}_{(solution)} = Fe^{+2}_{(zeolite)} + Ca^{+2}_{(solution)}$$

As set out in the above equations, one may impregnate raw zeolitic tuff with any desired soluble cation. The effluent produced is loaded with those cations originally in the zeolite structure, such as $Na^+$, $Ca^{+2}$, $K+$ and probably $Mg^{+2}$.

Impregnation of the zeolite depends on the following factors: i) the rate (speed) at which the solution containing the cation to be added to the zeolite is passed through the zeolitic tuff grains, with a slow rate being necessary to complete the exchange process; and ii) the temperature of the solution, with the higher the temperature of the solution the faster the cation exchange. For impregnation of the zeolite one may use an impregnation tank made of steel, cement or any other material that does not react with the salt solution being used.

Impregnation and ion exchange or washing with water: A solution containing the material to be impregnated into the zeolite is prepared. For example, one or more soluble fertilizers, soluble salts, such as ammonium sulfate, ammonium phosphate (or any salt containing ammonium ions), or any other soluble compounds of interest, such as ferrous sulfate, zinc sulfate, magnesium salts, potassium salts etc. are dissolved in water to form a solution. This solution is used to supply cationic materials that enter into the zeolite structure for slow release out of the Yenomite material when added to the soil. In addition, treatment of the Yenomite with such a solution results in the formation of a precipitate onto and between Yenomite granules which provide additional benefit to the soil and plants.

The concentration of impregnation solutions is determined by taking the following criteria into consideration. (1) The cation exchange capacity of the raw zeolitic tuff being impregnated (which can be determined in the laboratory using well know techniques): the higher the cation exchange capacity of the zeolitic tuff the higher the concentration of the solution. (2) The type of product required: the selection of the soluble salts is determined on the basis of the soil and/or plant type for which the Yenomite is destined to be used.

The crushed or ground raw zeolitic tuffs (prepared raw material) should be tested before impregnation to ascertain (1) electrical conductivity and (2) actual zeolite content and its cation exchange capacity. If the electrical conductivity (salt content) in the raw materiel is low (lower than 3 mmho) then there is no need for a water wash and the granules can be treated with the impregnation solution(s) directly. The impregnation solution should be flowed over the zeolitic tuff, submerging the tuff under a minimum of 20 cm of solution, thereby achieving good flow of the impregnation solution throughout the whole zeolitic tuff bed and good grain contact. At this stage one may achieve a faster rate of cation exchange by heating the impregnation solution. The volume of concentrated solution used should exceed the volume of raw zeolitic tuff granules being treated. Preferably, the height of the zeolitic tuff in the cation exchange tank should not exceed 2 meters.

If the electrical conductivity of the raw zeolitic tuff is high (more then 4 mmho), the raw zeolitc tuff granules should be washed with water to decrease the salt content. Hot water may be used to achieve better washing. The zeolitic tuff, washed with water, may be used as a non-impregnated material.

The contact time between the impregnation solution and the raw zeolitc tuff is preferably between 12 and 18 hours. This time may, of course, be increased or decreased after completion of the impregnation has been ascertained. The impregnated natural zeolitic material is subsequently left to drain. The filtration process may be sped up by using well techniques, such as vibrating screens, a filter press, or a vacuum pump.

The effluent may be tested during the draining operation for cation concentration, for example, sodium, calcium, potassium, ammonium, or any other cation concentration. The following may be measured from the effluent: (i) $Na^+$ concentrations of approximately 0.25% (sodium sulfate or sodium phosphate), (ii) very low $Ca^{+2}$ concentrations due to precipitation of the calcium ions as Calcium sulfate or calcium phosphate, (iii) $K^+$ concentrations of approximately 0.1% (potassium sulfate or other potassium salts), (iv) $Mg^{+2}$ concentrations of approximately 0.1% (magnesium sulfate or other magnesium salts), (v) $NH_4^+$ concentrations may be low (not exceeding 120 ppm) as this ion is extracted from the solution very efficiently by Yenomite which has a stronger selectivity for ammonium ions over other cations. The above is illustrative. Cation concentrations in the effluent solution may vary depending on the concentration of the original solution, the rate of the exchange and the rate of passage of the impregnation solution through the zeolite bed. The material is then ready to be packed or it may be used or sold loose.

Yenomite to be used as mulch on soil surface and around trees to keep retain in moisture in soil or to be used as an insulating material in construction can be packaged without being subjected to cation exchange with the impregnation solution. Yenomite to be used as soil media for plants or as moisture retention media may be additionally mixed with organic matter (as peat moss or manure). Washed or unwashed fine tufaceous material may be mixed with organic matter, such as peat moss or manure, for use in agriculture.

Yenomite may be combined with animal manure. All types of tufaceous materials or treated Yenomite may be treated with treated or untreated animal manure in a wide range of proportion. The Yenomite treated with manure can be used directly or heated to enhance reaction between the Yenomite and the manure and decrease moisture content. Heating causes ammonium cations and ammonia gas, that would otherwise escapes from the manure, to enter into the zeolite structure where these valuable materials are trapped instead of being lost to the atmosphere. Heating to a temperature of up to 150° C. leads to (1) increasing the amount of ammonia released by the manure into the soil, thus improving the quality of the manure, and (2) dehydrating the zeolite raw material which leads to a higher absorption of ammonia into the zeolite structure.

The Yenomite can be mixed with animal or chicken manure without heating, or it can be mixed with heating to a temperature of 70 to 150° C. in a rotary kiln, or the Yenomite (washed with water or impregnated) can be mixed with different ratios of manure without heating. The mixing should be carried out in a mixers capable of good mixing, such as a rotary kiln that can be used for heating and mixing.

Untreated Yenomite can heated to expel water in the zeolite. Natural zeolites can contains up to 25% of their weight in water. Yenomite can be dried at any temperature that will not destroy the zeolite crystal structure. Temperatures not exceeding 270° C. can be used for phillipsite zeolite (Jordanian zeolitic tuff of Ariatain area). Above this temperature the zeolite starts to loose its crystalline structure. Loss of water from heating creates voids in the zeolite structure which can be filled with water vapor or ammonia gas.

EXAMPLES

Yenomite Boosts the Growth of Tomato and Cauliflower Seedlings: In one study, vegetable seedlings were grown for a limited time (tomato: 68 days; cauliflower: 38 days) in various peat-based growth media typical for production of vegetable seedlings in the greenhouse. It was found that:

1. Growth media containing Yenomite resulted in larger plants at the end of the experiment than its equivalent without Yenomite. Benefit: Faster growth yields marketable plants sooner or bigger, more attractive plants in the same amount of time.

2. Adding Yenomite to the growth media increased the plant availability of the plant nutrients Potassium (K), Magnesium (Mg), Calcium (Ca), Iron (Fe), and Manganese (Mn). Benefit: Increased nutrient availability can prevent deficiencies that slow plant growth.

3. Yenomite boosted nutrient uptake. With Yenomite, cauliflower took up more Nitrogen (N), Magnesium (Mg), Calcium (Ca), and Boron (B). Tomato nutrient content was increased for N, Mg, Ca, B, Iron (Fe), Zinc (Zn), Copper (Cu), Phosphorus (P), and Potassium (K). Benefit: Increased nutrient content means a healthier, more nutritious vegetable.

Yenomite boosted plant growth regardless of whether fertilization was "organic" or conventional (with "chemical" fertilizer). Benefit: Both conventional and "organic" growers get increased yields from the use of this product.

In the study, Yenomite always increased tomato seedling size, regardless of "organic" or mineral nitrogen fertilization. Yenomite boosted size from 3% to 47.5%.

| Treatment | Tomato seedling size boost by ASI Product |
| --- | --- |
| Mineral nitrogen fertilizer, no compost | 47.5% |
| "Organic" nitrogen fertilizer, no compost | 45% |
| Mineral nitrogen fertilizer, with compost | 3% |
| "Organic" nitrogen fertilizer, with compost | 20% |

This means that even an "organic" grower who is using an optimum potting mix ("organic" nitrogen plus compost) can still increase seedling performance by 20% by adding Yenomite.

The same effects were observed for cauliflower seedlings. Yenomite always increased cauliflower seedling size, regardless of "organic" or mineral nitrogen fertilization. Yenomite boosted size from 18% to 160%.

| Treatment | Cauliflower seedling size boost by ASI Product |
| --- | --- |
| Mineral nitrogen fertilizer, no compost | 160% |
| "Organic" nitrogen fertilizer, no compost | 66% |
| Mineral nitrogen fertilizer, with compost | 35% |
| "Organic" nitrogen fertilizer, with compost | 18% |

In both cauliflower and tomato seedlings, Yenomite increased the uptake of several mineral plant nutrients.

Yenomite Boosts the Growth of Tomato and Lettuce

In a second study, tomatoes and lettuce were grown to maturity under greenhouse conditions in a clay soil typical for Jordanian vegetable production. The results therefore allow judging the effect of Yenomite on the production of marketable produce. Specific findings are:

1. Adding Yenomite to the soil increased the yield of lettuce (increases: 8.5% to 91.7%) and tomato (increases: 13.5% to 73.6%) compared to the current fertilization practices. Yield increased almost linearly with increased Yenomite applications from 5 tons/hectare to 20 tons/hectare. This yield increase happened despite the fact that the soil was already very high in plant-available Phosphorus (P) and Potassium (K), two of the most important plant nutrients. Benefit: More marketable product from the same land area, beyond that what can be grown with additional fertilizer or under very high soil fertility. This means even a grower who is already investing in top management can still expect an increase in profits.

2. Yenomite increased nutrient uptake of the plants. Benefit: The produce is more nutritious.

3. Water use efficiency (WUE) increased with increasing rates of Yenomite. WUE is a measure of how much product is grown for each unit of water used. Lettuce WUE increased linearly up to 20 tons/hectare. Tomato WUE increased up to a Yenomite application rate of 15 tons/hectare, then dropped again somewhat. Benefit of increased WUE: More produce can be grown with the same amount of water, a big advantage for arid areas dependent on limited sources of irrigation water and/or limited rainfall. Even if unlimited irrigation water is available, savings from less pumping can be significant.

Based on the results, the optimum grain size appears to be 2 mm. The optimum application rate of Yenomite could be beyond the highest rate used of 20 tons/hectare, and may be different for each crop, soil type, and fertility level.

Overall, both studies show that adding Yenomite to the soil increased yield as a result of increased nutrient uptake by three different crops (tomato, lettuce, and cauliflower).

Obviously, numerous modifications and variations of the present invention are possible in light of the above teachings. It is therefore to be understood that within the scope of the appended claims, the invention may be practiced otherwise than as specifically described herein.

What is claimed is:

1. In the cultivation of an agricultural or horticultural plant in soil, the improvement comprising adding to said soil an amount of Yenomite effective to improve the growth or development of said plant, said plant comprising one or more plant seed, plant seedling, growing plant or mature plant.

2. The cultivation of claim 1, said Yenomite comprising, as a major zeolitic component, phillipsite, and palagonite.

3. An agricultural cultivation according to claim 1.

4. A horticultural cultivation according to claim 1.

5. The cultivation of claim 3, said yenomite comprising, as a major zeolitic component, phillipsite, and palagonite.

6. The cultivation of claim 5, said yenomite comprising an agricultural plant.

7. The cultivation of claim 5, said yenomite comprising a horticultural plant.

8. The cultivation of claim 1, said Yenomite comprising one or more additional zeolites selected from the group consisting of faujasite and chabazite.

9. The cultivation of claim 1, wherein said plant is a grass.

10. The cultivation of claim 9, wherein said grass is a lawn.

11. The cultivation of claim 9, wherein said grass is a pasture.

12. The cultivation of claim 9, wherein said grass is a golf course.

13. The cultivation of claim 9, wherein said grass is turfgrass.

14. The cultivation of claim 1, wherein said plant is a ground-covering plant or an ornamental plant.

15. The cultivation of claim 14, wherein said ornamental plant is a flower.

16. The cultivation of claim 15, wherein said flower is one member selected from the group consisting of carnations, mums, golden pothos, impatients, pansies, violets, begonias, gardenias, hydrangea, lilacs, sunflowers, orchids, pointsettia, phalenopsis, bromiliad, snapdragons, alstroemeria, gerbera daisies and other daisies, freesia, liatris, antherum, delphinium, roses, lilies, irises, daffodils, hyacinths and tulips.

17. The cultivation of claim 1, wherein said plant is a vegetable plant selected from the group consisting of asparagus, beans, beets, bell peppers, broccoli, cabbage, cantaloupe, carrot, cauliflower, celery, collard, cucumbers, pickles, eggplant, fennel, garlic, honeydew melon, kohlrabi, lettuce, leek, muskmelon, mustard green, onion, green onion, okra, pea, pepper (*Capsicum* spp.), potato, pumpkin, radish, spinach, squash, sweet corn, sweet potato, tomato, turnip, watermelon, yam, and zucchini plants.

18. The cultivation of claim 1, wherein said plant is an herb a shrub, a succulent or a fem.

19. The cultivation of claim 1, where said plant is a vine.

20. The cultivation of claim 19, wherein said vine is a grape or kiwi vine.

21. The cultivation of claim 1, wherein said plant is a tree.

22. The cultivation of claim 21, wherein said tree is a fruit tree selected from the group consisting of apple, apricot, avocado, banana, cherry, coconut, grapefruit, lemon, lime, nectarine, olive, orange, peach, pear, plum, prune, tangelo, and tangerine, trees.

23. The cultivation of claim 1, wherein said plant is barley, corn (maize), emmer, oats, rice (*Oryza* spp.), rye, sorghum, spelt, triticale, wheat, or wild rice (*Zizania* spp.).

24. The cultivation of claim 1, wherein said plant is a pulse crop selected from the group consisting of soybean, dry bean, lentil, lupin, and pea plants.

25. The cultivation of claim 1, wherein said plant is a berry plant selected from the group consisting of cranberry, blackberry, blueberry, boysenberry, gooseberry, raspberry, and strawberry plants.

26. The cultivation of claim 1, wherein said plant is a nut-bearing plant selected from the group consisting of almond, cashew, hazelnut, pecan, and walnut plants.

27. The cultivation of claim 1, wherein said plant is an oil-producing plant selected from the group consisting of canola, cranbe, cottonseed, flax, mustard, peanut, rape, safflower, and sunflower plants.

28. The cultivation of claim 1, wherein said plant is one member selected from the group consisting of cotton, pineapple, sugarcane, sugarbeet, tobacco, and hemp plants.

29. The cultivation of claim 1, said Yenomite further comprising one or more members selected from the group consisting of smectite and calcite.

30. The cultivation of claim 1, said Yenomite further comprising one or more micronutrient, fertilizer, pesticide, herbicide, or fungicide.

31. The cultivation of claim 30, wherein said micronutrient is one or more member selected from the group consisting of boron, copper, iron, manganese, molybdenum, and zinc ions.

32. A method for reducing the release of fertilizers used in growing agricultural or horticultural plants into the environment comprising adding to the soil in which said plants are grown an amount of Yenomite effective to reduce fertilizer release in the environment.

33. The method of claim 32 comprising growing an agricultural plant.

34. The method of claim 32 comprising growing a horticultural plant.

35. The method of claim 32 wherein said plant comprises a grass.

36. The method of claim 32 comprising growing a lawn, a pasture, or a golf course.

37. The method of claim 35 wherein said grass is turfgrass.

38. A method for improving the efficiency of water used in growing agricultural or horticultural plants comprising adding to the soil in which said plants are grown an amount of Yenomite effective to improve said water utilization.

39. The method of claim 38 comprising growing an agricultural plant.

40. The method of claim 38 comprising growing a horticultural plant.

41. The method of claim 38 wherein said plant comprises a grass.

42. The method of claim 38 comprising growing a lawn, a pasture, or a golf course.

43. The method of claim 41 wherein said grass is turfgrass.

* * * * *